United States Patent [19]
Namanny

[11] Patent Number: 5,195,457
[45] Date of Patent: Mar. 23, 1993

[54] PET ENCLOSURE

[76] Inventor: Bradley L. Namanny, 4619 W. Broadway, Hawthorne, Calif. 90250

[21] Appl. No.: 931,140
[22] Filed: Aug. 17, 1992
[51] Int. Cl.$^5$ .................................................. A01K 1/00
[52] U.S. Cl. ........................................ 119/19; 119/165
[58] Field of Search ................... 119/15, 17, 19, 165

[56] References Cited

U.S. PATENT DOCUMENTS

| | | | |
|---|---|---|---|
| 3,885,523 | 5/1975 | Coleman | 119/19 |
| 4,291,645 | 9/1981 | Crachelow et al. | 119/19 |
| 4,432,303 | 2/1984 | Ellerstorfer | 119/17 |
| 4,445,459 | 5/1984 | Julie | 119/19 |
| 5,092,270 | 3/1992 | Simons et al. | 119/19 |
| 5,148,767 | 9/1992 | Torchio | 119/15 |

Primary Examiner—John G. Weiss
Attorney, Agent, or Firm—Poms, Smith, Lande & Rose

[57] ABSTRACT

A pet enclosure adapted to be mounted to a window sill permitting access from the interior of a room into the enclosure. The enclosure has a perch for the pet and a removable waste receptacle.

11 Claims, 2 Drawing Sheets

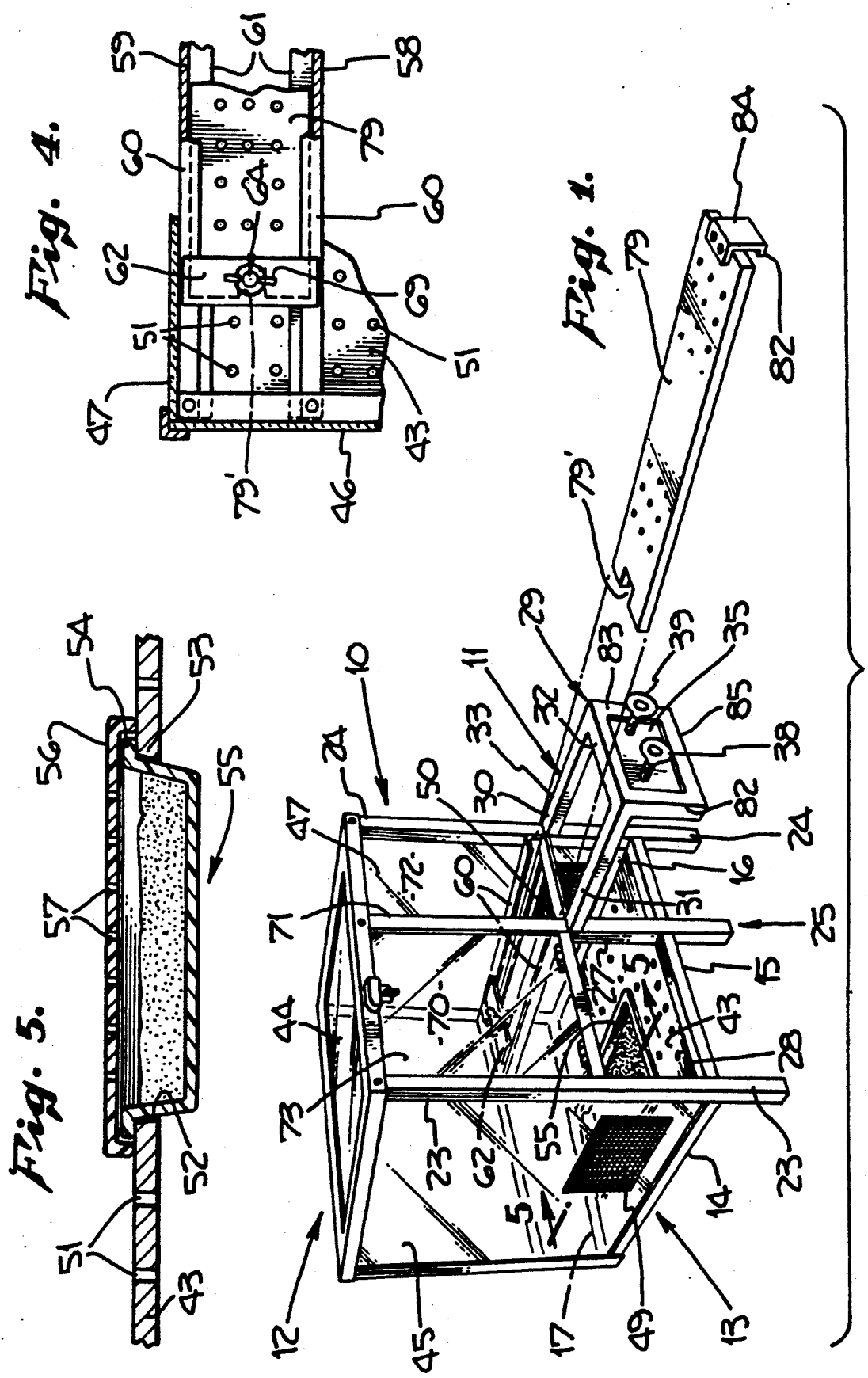

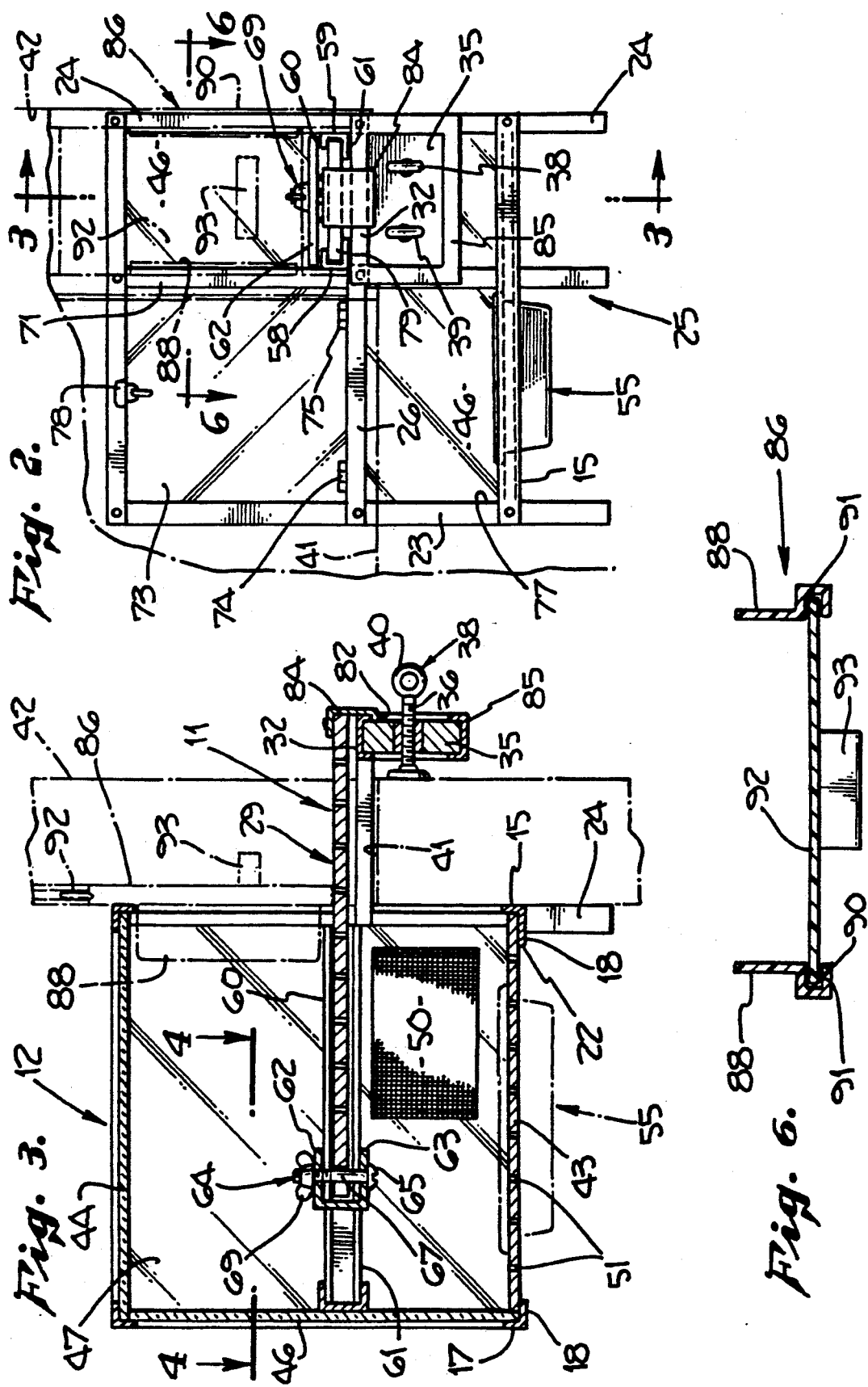

5,195,457

PET ENCLOSURE

BACKGROUND OF THE INVENTION

1. Field of the Invention

The invention relates to pet enclosures; and, more particularly, to an enclosure detachably mounted to a window sill of a room wherein the enclosure is disposed outside of the room.

2. Description of the Prior Art

Many people keep small pets in apartments and the like. It is undesirable to keep such pets cooped up in a house or the like without occasional outings. However, it is difficult for many people to take a dog for a walk, or let a cat or bird or the like out of the apartment or house.

Further, keeping a small pet in a house or apartment without airing the pet may result in undesirable odors. Further, some people may not mind the presence of a pet in the house whereas their friends or companions may not like having a pet in the house.

Some pets, such as cats, like to bask in the sun or to look out a window. Dogs like to be cool, but cats like air and heat. Thus, cats like sun, fresh air, enough room to move around in and a ledge to bask in or jump up and down on. Small dogs may also like to bask in the sun on a ledge or perch or lie in a cool shaded well aerated area.

Thus, there is a need for a pet enclosure which can be quickly and easily attached to a window sill of a room or the like where the enclosure itself is outside of the room with pet access from the room into the enclosure.

SUMMARY OF THE INVENTION

It is an object of this invention to provide a pet enclosure that is detachably mounted to the window sill of a room or the like.

It is a further object of this invention to provide such an enclosure having access from the interior of the room into the interior of the enclosure outside of the room.

It is still further an object of this invention to provide such a pet enclosure having a ledge for the pet to rest on and a removable pet waste collection area.

These and other objects are preferably accomplished by providing a pet enclosure adapted to be mounted to a window sill permitting access from the interior of a room into the enclosure. The enclosure has a perch for the pet and a removable waste receptacle.

BRIEF DESCRIPTION OF THE DRAWINGS

FIG. 1 is a perspective view of a pet enclosure in accordance with the teachings of the invention.

FIG. 2 is an elevational view of a portion of the front end of the enclosure of FIG. 1;

FIG. 3 is a view taken along lines 3—3 of FIG. 2;

FIG. 4 is a view taken along lines 4—4 of FIG. 3;

FIG. 5 is a view taken along lines 5—5 of FIG. 1; and

FIG. 6 is a view taken along line 6—6 of FIG. 2.

DESCRIPTION OF THE PREFERRED EMBODIMENT

Referring now to FIG. 1 of the drawing, FIG. 1 is a perspective side view of the pet enclosure 10 of the invention. Enclosure 10 includes a mounting structure 11 (see also FIG. 3) and an outdoor box 12. Mounting structure 11 includes an open framework 13 which may be comprised of four interconnected members 14 to 17, (see also FIG. 3) each side wall having horizontally inwardly extending flanges 18, forming a generally rectangular framework encompassing opening 22.

A pair of vertical side legs 23, 24 (see FIG. 2) are coupled on each side of framework 13 which legs 23, 24 are in turn secured to an elongated open framework 25 (see FIG. 1). Flange 18 of member 15 forms the bottom of framework 25 (secured to legs 23, 24) and an elongated upper member 26, spaced from member 15, is also connected to legs 23, 24, forming the top of framework 25. An intermediate vertical flange 27, between legs 23, 24, divides framework 25 into two parts, one side (the left side in FIG. 1) having an opening 28 and the other side having an L-shaped sill mounting bracket 29.

Bracket 29 has an upper open framework 30 defined by interconnected brackets 31 to 33. A front panel 35 extends downwardly from bracket 34 spaced from framework 25. Panel 35 has one or more apertures therethrough, such as apertures (FIG. 3) which may be threaded, receiving therein tightening screws 38, 39, respectively. Each screw 38, 39 has an integral enlarged head, such as ring 40 (FIG. 3) for grasping the same.

In operation, bracket 29 is disposed over a conventional window sill 41, as shown in dotted lines in FIG. 3, with framework 13 extending outside of the window 42 associated with sill 41. Screws 38, 39 are then tightened to firmly secure bracket 29 to sill 41.

Box 12 has a base 43, a top wall 44, and interconnected side walls 45-48 (see also FIG. 1). Top wall 44, and side walls 45, 46, 47 may be of glass or plastic or the like and generally imperforate. However, vents 49, 50 (FIG. 1 and 3) may be provided on portions of side walls 45, 46, 47 and top walls 44, such as vents 49, 50 associated with the lower portions of side walls 45, 47, respectively.

Base 43 may also be screened or vented, or perforated as shown in FIG. 3 as having a plurality of spaced air holes 51 therethrough. A hole or opening 52 (FIG. 5) may be provided in base 43. As seen in FIG. 5, hole or opening 52 may have peripheral flange 53 adapted to support thereon the lip 54 of a kitty litter receiving tray 55 that can be removably mounted in hole or opening 52. If desired, a cover or lid 56, also perforated via holes 57, may be provided conforming to opening 52 for closing off the same when it is not necessary or desired to use tray 55.

As seen in FIG. 1, opening 52 is on the left side of box 12. On the opposite or right side in FIG. 1, as particularly seen in FIG. 4, a pair of spaced tracks 58, 59 are provided spaced up from base 43. As seen in FIG. 2, each track 58, 59 is comprised of a first elongated upper flange 60 spaced from a second elongated lower flange 61. A pair of spaced interconnected cross-plates 62, 63 (FIG. 3) are disposed on flanges 60, 61, plate 62 extending across the top of flanges 60 and plate 63 extending across the bottom of flange 61. A tightening screw 64, showed in detail in FIG. 3, is provided having a slotted head 65 abutting against flange 63 through which the shaft 67 of screw 64 extends. Wing nut 69 is threaded on shaft 67 to tighten screw 64 against plates 62, 63 and thus lock the plates 62, 63 in any desired location along tracks 58, 59.

As seen in FIG. 1, the front or area opposite rear wall 46 of box 12 has an elongated open area 70 separated by support flange 71 from a second area 72. Area 70 is closed off (FIG. 2), by door 73, hinged at hinges 74, 75 to flange 26, and has a lower open area 77 below flange 26. As seen in FIG. 3, flange 26 is generally aligned with lower flange 15. A lock 78 may be provided at the top of door 73 removably locking door 73 to top wall 44.

The configuration of base 43 of box 12 is such that it can fit within framework 13, as shown in FIG. 1. Side walls 15 to 17 may extend upwardly a sufficient distance to accommodate box 12 and hold it in place as seen in FIG. 3.

As seen in FIG. 1, an elongated panel 79, which may also be perforated, is slid between flange 60, 61 until it abuts against screw 64. Panel 79 may have a cut-out section 79' where it abuts against screw 64 for receiving screw 64 therein. Tightening of wing nut 69 thus tightens plates 62, 63 in any desired location along tracks 58, 59. Panel 79 has a flange plate 84 (FIG. 3) secured to the end opposite section 79' with an inwardly extending lip 82 at its lower end. Panel 35 is mounted to brackets 31, 33 by spaced side flanges 82, 83 (see also FIG. 1), top flange 32 and bottom flange 85. Lip 82 thus extends under top flange 32 (FIG. 3) and abuts against panel 35 to firmly hold panel 79 to mounting structure 11.

If it is desired to close off the opening 72 (FIG. 1) leading into box 12, a removable closure member 86 (FIGS. 2, 3 and 6) may be provided having interconnected side walls 88 (FIG. 3 and 6) which side walls may extend into opening 72 as seen in FIG. 3 (only one wall 88 being visible in FIG. 3). Window 42 may be slid laterally (if of that type of window) to abut against either side wall 88. Closure member 86 may be comprised of a framework 90 (FIG. 2) having a track 91 (see FIG. 6) on each side receiving therein in a friction fit relationship a slidable door 92. Thus, door 92 may be raised and lowered to selectively open and close opening 70 to provide access to, or exclude access to, the interior of box 12. A handle 93 may be provided at the bottom of door 92 to assist in raising and lowering the same.

Any suitable materials may be used, such as glass, clear or opaque plastic, etc. Steel or plastic may be used for the support members.

It can be seen from FIG. 1 that panel 79 will be disposed inside of the room or house in which apparatus 10 is installed. A cat or dog or the like can jump on panel 79 and, if door 92 is open or raised, enter box 12. The pet can then sit on top of panel 79 basking in the sun. If the pet desires to use the litter box 55 (cover 56 being removed), it can do so. The box 12 is well ventilated and can be of clear plastic or glass to provide sun for the animal. A shady resting spot is provided under panel 79. Door 73 can be unlocked so as to provide access to the interior of box 12 for cleaning out the same, particularly removing tray 55.

The apparatus 10 can be used in any window having a sill or ledge. If such window opened upwardly, it can be closed down on top of walls 88.

There is thus disclosed a novel pet enclosure which can be used by many types of small pets, such as dogs, cats, birds, snakes, etc. A water tray can be placed in box 12. The interior of box 12 is well ventilated so odors are kept out of the house or apartment.

I claim:

1. A pet enclosure adapted to be mounted to a window sill of a house or apartment or the like comprising:

a framework having a first elongated framework defining a pair of spaced side walls, an interconnecting front wall and an interconnecting rear wall;

a bracket connected to said front wall, said bracket having a first portion extending above said front wall terminating in a top flange, a second portion extending in a generally horizontal plane from said top flange, and a third portion integral with said second portion extending downwardly generally normal thereto and spaced from said first portion;

a box-like structure mounted in said framework, said structure having a top wall, a bottom wall, a front wall and a rear wall, and side walls interconnecting said last-mentioned top, and bottom, front and rear walls, said first portion abutting against said structure front wall when said box-like structure is mounted in said framework, said structure front wall having a first open area leading into the interior of said structure above said bracket top flange, a second open area adjacent said first open area leading into the interior of said structure above said bracket top flange, said first open area being disposed above said bracket second portion and said second open area being closed off by a door hingedly mounted to said structure; and a panel associated with said second portion leading from substantially said third portion into the interior of said structure on one side thereof, said panel being spaced from the bottom wall of said structure when disposed in the interior of said structure.

2. In the enclosure of claim 1 wherein releasable locking means are associated with said panel, said bracket and said box-like structure for locking said panel to both said bracket and said structure.

3. In the enclosure of claim 2 wherein said releasable locking means is adjustably and releasably locked to said box-like structure.

4. In the enclosure of claim 1 including a removable panel assembly disposed on top of said bracket second portion closing off said first open area.

5. In the enclosure of claim 4 wherein said removable panel assembly includes a pair of spaced side flanges extending from the exterior of said box-like structure a short distance into the interior thereof and a door normally closing off an opening through said panel assembly leading into the interior of said structure.

6. In the enclosure of claim 5 wherein said door is slidably mounted on said panel assembly movable from a first position normally closing off said opening to a second position providing access through said opening.

7. In the enclosure of claim 1 including a litter box disposed in the bottom wall of said box-like structure.

8. In the enclosure of claim 7 including a cut-out area in the bottom wall of said box-like structure, said litter box being removably mounted in said cut-out area.

9. In the enclosure of claim 8 including a removable cover closing off the top of said litter box.

10. In the enclosure of claim 1 wherein at least some of said walls of said box-like structure are ventilated.

11. In the enclosure of claim 1 wherein said panel is ventilated.

* * * * *